United States Patent [19]
Harris et al.

[11] Patent Number: 5,533,108
[45] Date of Patent: Jul. 2, 1996

[54] METHOD AND SYSTEM FOR ROUTING PHONE CALLS BASED ON VOICE AND DATA TRANSPORT CAPABILITY

[75] Inventors: Rosemary H. Harris, Colts Neck; Richard F. Bruno, Morristown, both of N.J.

[73] Assignee: AT&T Corp., Murray Hill, N.J.

[21] Appl. No.: 215,069

[22] Filed: Mar. 18, 1994

[51] Int. Cl.⁶ .................................................... H04M 3/42
[52] U.S. Cl. .................... 379/201; 379/265; 379/266; 379/207; 379/216; 379/93; 379/96; 370/110.1; 370/84; 348/14; 348/15
[58] Field of Search ................ 379/93, 94, 96, 379/97, 201, 207, 220, 221; 370/60, 60.1, 84, 110.1, 94.1, 79; 348/14, 15, 16

[56] References Cited

U.S. PATENT DOCUMENTS

| | | | |
|---|---|---|---|
| 4,611,094 | 9/1986 | Asmuth et al. | 379/201 |
| 4,730,312 | 3/1988 | Johnson et al. | 370/110.1 |
| 4,757,267 | 7/1988 | Riskin | 379/113 |
| 4,924,510 | 5/1990 | Le | 379/221 |
| 4,998,248 | 3/1991 | Matsuzaki | 379/94 |
| 5,003,595 | 3/1991 | Collins et al. | 379/100 |
| 5,046,189 | 9/1991 | Kainuma | 379/93 |
| 5,067,125 | 11/1991 | Tsuchida | 370/110.1 |
| 5,136,636 | 8/1992 | Wegrzynowicz | 379/207 |
| 5,153,897 | 10/1992 | Sumiyoshi et al. | 379/93 |
| 5,267,301 | 11/1993 | Nishii | 379/93 |
| 5,276,679 | 1/1994 | McKay et al. | 370/100.1 |
| 5,276,687 | 1/1994 | Miyamoto | 379/94 |
| 5,361,299 | 11/1994 | Izumi | 370/110.1 |
| 5,371,534 | 12/1994 | Dagdeviren et al. | 379/94 |
| 5,467,390 | 11/1995 | Brankley et al. | 379/229 |

FOREIGN PATENT DOCUMENTS

| | | | |
|---|---|---|---|
| 0648395 | 8/1992 | Australia | 379/94 |

*Primary Examiner*—Jeffery Hofsass
*Assistant Examiner*—Parag Dharia

[57] ABSTRACT

A method and system for routing phone calls from a caller to a selected destination based on voiceband (voice) and digital services (data) transport capabilities is disclosed. The selected destination is one of a plurality of destinations identified by a common telephone number such as an 800 number. A plurality of discriminators common to both voice and data calls are associated with the phone call. An additional data rate discriminator is also associated for a data call corresponding to a requested data rate from the calling party. A database, such as a direct services dialing database, is accessed in response to receiving the common telephone number from the calling party for obtaining a destination number for a voice call based on the common discriminators, and a separate destination number for a data call. The separate destination number for the data call is based on the common discriminators and the desired data rate. The call is completed by directing the call to the selected destination number.

24 Claims, 6 Drawing Sheets

METHOD AND SYSTEM FOR ROUTING PHONE CALLS BASED ON VOICE AND DATA TRANSPORT CAPABILITY

FIELD OF THE INVENTION

This invention relates to a method and system for routing a phone call from a caller to a selected destination of a network subscriber, such as an 800 number subscriber, wherein the selected destination is one of a plurality of destinations of the subscriber identified by a common telephone number.

BACKGROUND OF THE INVENTION

The voice services network offers many services and features besides simple "toll-free" 800 and charged 900 services. Initially, a basic "toll-free" 800 number call was a simple one-to-one translation from the 800 dialed call to a traditional POTS destination telephone number with the associated reverse billing capability. At present, a single 800 toll free call placed on the voice services network can now be directed to different destinations based on numerous common discriminators such as the time of day, the originating NPA, basic information about the callers, the location of the calling party, any additional digits collected from the caller, the availability and preferences of the called party, as well as such items as call forwarding options when a busy signal is obtained.

New forms of digital communication services based on digital technologies are now being introduced into the phone networks. These digital communication services require end-to-end digital facilities in contrast to voiceband (POTS) services. Throughout the remainder of this description, data calls will refer to digital communication services calls and voice calls will refer to all forms of voiceband services carried over the POTS network. Digital services send various data calls on network lines such as the 56/64 Kbps data lines to transfer data for multimedia purposes, file and image transfer, slow scan video and numerous other data transfer requirements. Although the digital services networks are becoming prevalent in the telephone network, 800 toll free and other similar voice services are not provided for digital connections. The existing 800 toll free services network does not recognize data calls, and thus the data call would be routed as a voice call.

Some network subscribers of toll free 800 and similar services are now requesting end-to-end digital connections at various data rates to accommodate different data services such as image transfer and multimedia applications and to support hardware such as video terminals. For example, a high-end mail order service uses an 800 toll-free number for soliciting orders from its catalog. Adding end-to-end data capability to the same 800 toll free number would provide that mail order service with the option of using one telephone number to allow its customer to access different types of services, that is voice calls would go to a regular voice agent while data calls would be answered by a video agent. A video agent would provide a caller with visual representations of products and other order information. Other 800 toll free network subscribers may subscribe to smaller or larger data rates depending on the type of digital application, end user's equipment, job or service requirements, and willingness to pay.

In addition, different calling parties may request different data transport rates for data calls. One caller may request a 56 Kbps rate and another caller may request a 64 or 384 Kbps data call depending on the requested service. Thus, the data rate requested by a caller would become a "decision variable" used in combination with existing common discriminators to manage incoming calls efficiently. These data calls requesting separate rates (and services) could be served at separate destinations because the demand for such data calls may at first be small when any such system is implemented, and each requested data rate could possibly correspond to a different service. This allows the network subscriber to optimize the use of the various call centers.

SUMMARY OF THE INVENTION

The above problem is solved, and an advance is made over the prior art in accordance with the principles of this invention, by a method and system for routing a telephone call from a caller to a selected destination that is one of a plurality of destinations identified by a common telephone number, based upon whether the call is a voice call or a data call, and, for each data call, the data rate and handling capabilities required to complete and service the call.

A plurality of discriminators common to both voice and data calls are associated with all calls. These discriminators may include such variables as the time of day, the originating NPA, information about the caller, the availability and preferences of the called party, as well as other features such as call forwarding options. For a data call, an additional data rate discriminator is associated with the call. In some instances, the data rate discriminator corresponds to a desired data rate explicitly requested by the calling party. For example, the data rate discriminator may be determined as a function of the information transfer capability, and the information transfer rate fields of the "Bearer Capability Information Element" (BCIE) of an ISDN call. Alternatively, the data rate discriminator may be implicitly requested by the calling party, as indicated by the nature of the transport capability of a transmission medium on which a call has been placed by the calling party.

A database, which in one aspect of the invention is a direct services dialing database, is accessed in response to receiving the common telephone number from the calling party, and is arranged to provide a destination number for a voice call, based on the common discriminators. A destination number for a data call, which may be different from the destination number for a voice call, even a call made by the same caller, is obtained, based jointly on the common discriminator, as well as the data rate discriminator. Note here that the destination number for data calls having different data rates may also be different. The data call is completed by directing it to one of the destinations identified by the common telephone number that can service that type of data call, via facilities that provide the required data rate.

The database is typically accessed via the data network comprising signal transfer points. The database can be queried to determine if the common telephone number has been provisioned for the requested data rate capability. The call is terminated if the number has no such data rate provision. In still another aspect of the invention, a first database, which can be an INWATS database, is accessed to obtain a routing number to a secondary database. The secondary database, which comprises a Direct Services Dialing database, is accessed to obtain the destination number.

BRIEF DESCRIPTION OF THE DRAWINGS

The foregoing features and advantages of the present invention will be appreciated more fully from the following description, with reference to the accompanying drawings in which.

DETAILED DESCRIPTION OF THE INVENTION

Figure 1:
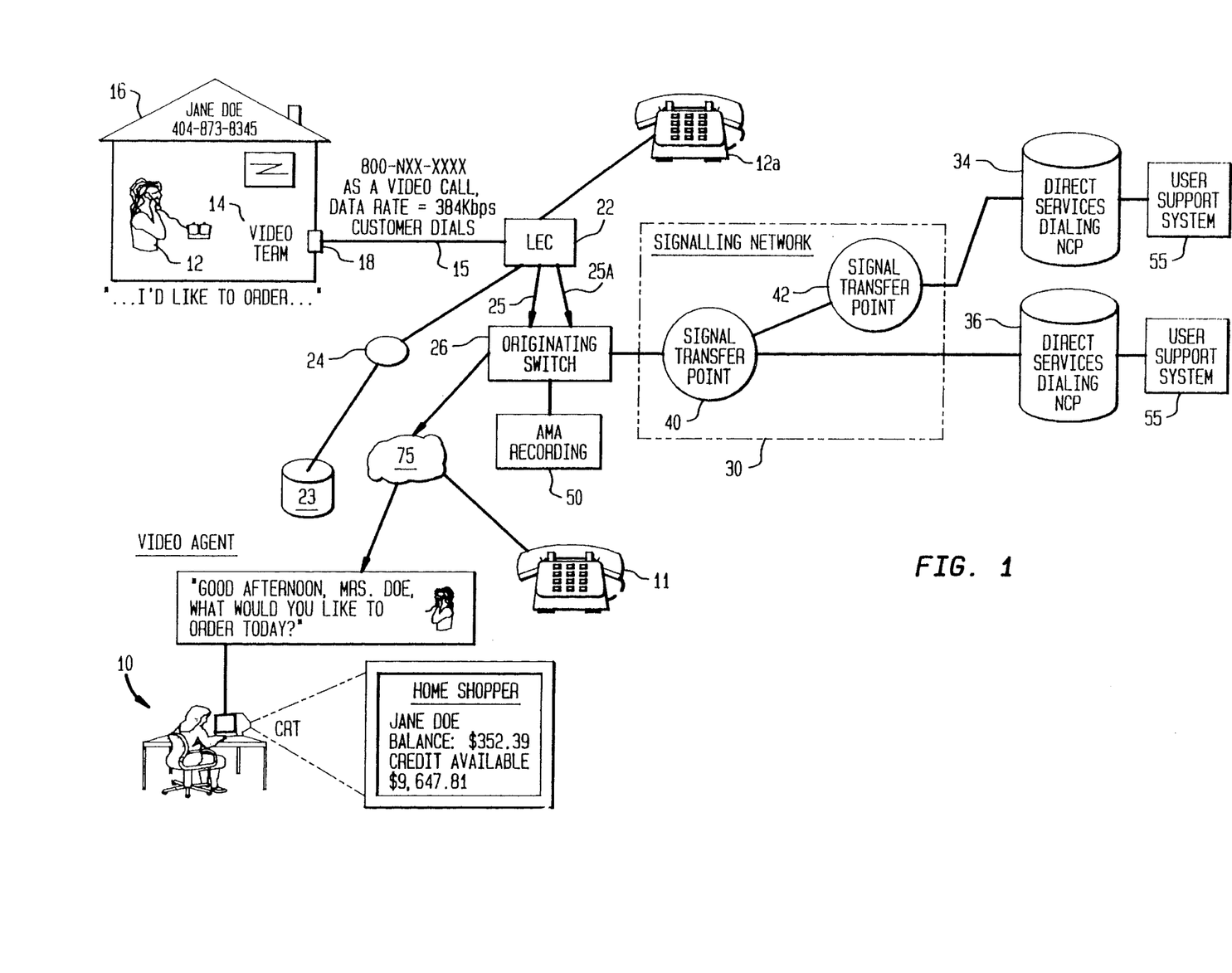
FIG. 1 is a block diagram of an illustrative embodiment of the invention showing an 800 toll free service with end-to-end data capability and direct access from the originating switch to the Direct Services Dialing database.

Referring now to FIG. 1, there is illustrated a block diagram of one exemplary embodiment of the invention, which allows a phone call to be routed from a caller to a selected destination of a network subscriber based on voice and data transport capability. For purposes of understanding, the following description relative to FIG. 1 is set forth based on a toll free network subscriber who owns a home shopping catalog service and has a video agent 10 and a regular voice agent 11 which can be accessed via the same 800 number. One caller 12 may desire a data connection to the video agent 11 and another caller 12a may desire, via the same 800 number, a call to the regular voice agent 11. Although the present invention will be described with reference to an 800 toll free service, those skilled in the art will recognize that the present invention is applicable to "900" and other similar calls which require intelligent call processing.

In this instance, the caller 12 is using a video terminal 14 at the home residence 16. The video terminal 14 is connected to a data trunk phone line 15 via standard data services connection means 18. The caller 12, Ms. Jane Doe, has an originating telephone number, 404-873-8845, and dials the 800 number for the network subscriber. The call is a data call and the caller 12 requests a data rate of 384 Kbps for an ISDN video call. The call travels through the data trunk phone line 15 extending from the home residence 16 to the local exchange carrier 22.

In accordance with the present invention, this call, as an 800 toll free call, has associated with it a plurality of discriminators which are common to both voice and data calls from that home residence 16. These discriminators include common decision variables which are now a part of many toll free 800 service calls and other similar services, such as the originating telephone number, the time of day, the nature of the caller (business or residence), additional information about the caller, as well as other variables such as the availability and preferences of the called party, call forwarding routines and other similar routines. In addition to these common discriminators, in accordance with the present invention, an additional data rate discriminator corresponding to the requested data rate of the caller is included.

For example, the requested data rate could vary from 56 Kbps to 1,536 Kbps and in some instances, higher. The local exchange carrier (LEC) 22 receives the call, which now has the common discriminators including the data discriminator associated with it. Because the LEC 22 recognizes the call as an 800 toll free number, the LEC queries its 800 toll free database 23 through its signal transfer points 24, and identifies the call as belonging to a certain network carrier, such as AT&T.

The local exchange carrier 22 switches the call to the proper network carrier using bearer capability routing. If the call originally were a voice call, the local exchange carrier will route the call to the proper network carrier on Feature Group-D voice trunks 25, which also are used for calls originating from a modem or other voiceband data devices. For digital services calls, the call would be routed on Feature Group-D data trunks 25A. In some instances, all of the FG-D trunks between the LEC and a network carrier will be considered as data trunks because they are all data trunk capable. In this case, the LEC will signal the type of connection in the IAM message through Signaling System 7 Network Interconnect. The local exchange carrier 22 will send the call to an originating switch also known as an Originating Screening office/Action Point (OSO/ACP) 26, with the caller's number identified by an automatic number identification (ANI) code, plus the 800 number dialed by the caller, as well as the other discriminators. For data calls, the data discriminator, which is explained in detail below, can be sent in the IAM or it may be implied from the digital capacity of the data trunks. The number identified by the ANI can be used for billing purposes and represents a billing number of the caller.

Figure 3:
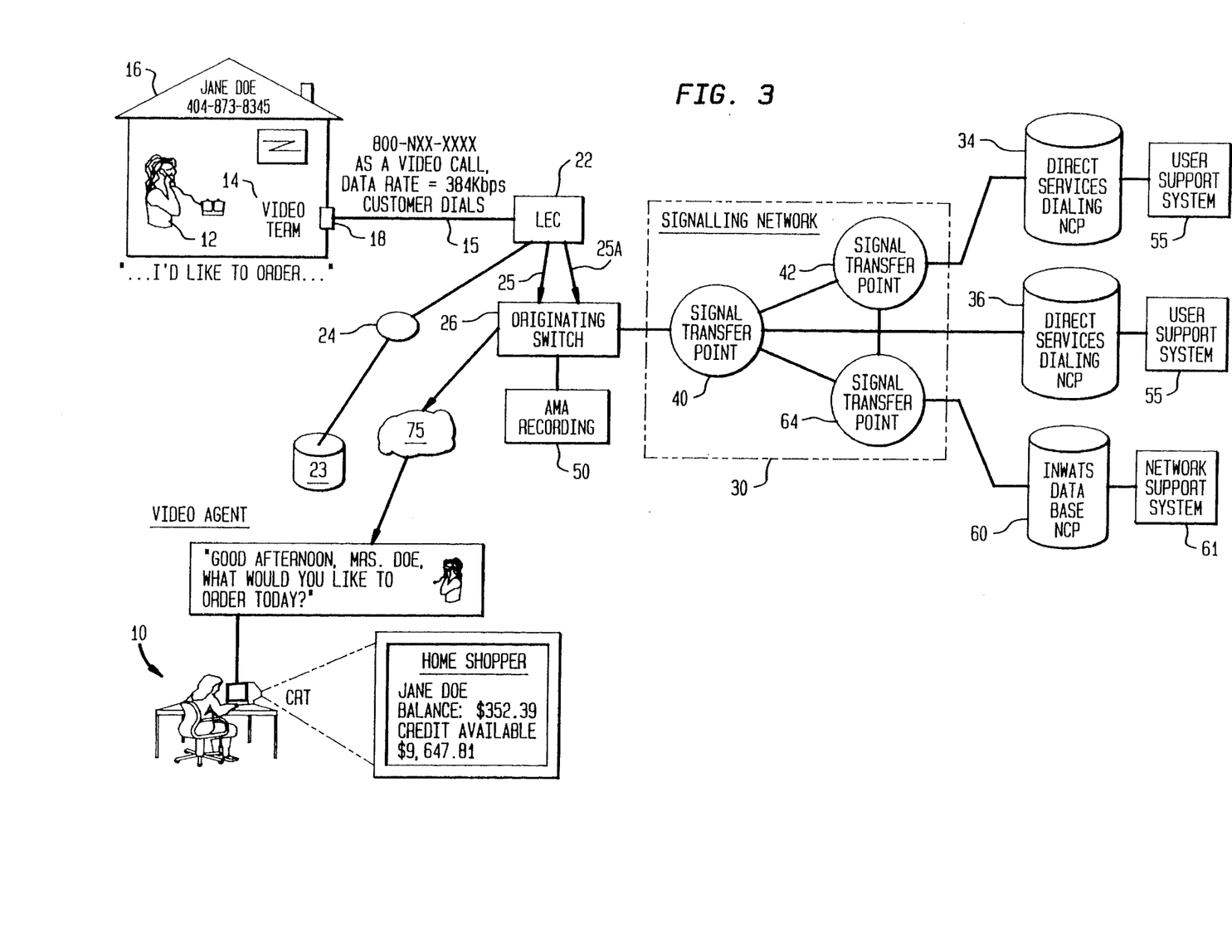
FIG. 3 is a block diagram similar to that of FIG. 1 and illustrating the 800 toll free service where an INWATS database is first accessed.

As shown in FIG. 3, the original caller 12 could have a conventional ISDN basic rate interface (BRI) creating a pure digital connection. The call setup message, which is standard with these ISDN connections, would include some of the common discriminators as well as the desired data rate as an additional discriminator. To be more specific, the Bearer Capability Information Element (BCIE), which is a mandatory part of each ISDN call set-up message, includes several information fields which by themselves do not unambiguously indicate the precise nature of a call being placed in conjunction with that message. However, by considering several of the fields within each BCIE, a call to be routed over a voice band facility can be distinguished from one requiring treatment as a data call, and further, the rate required for the data call can also be determined. The foregoing is illustrated in the following examples, which provide the values of the (a) information transfer capability, (b) transfer mode, (c) information transfer rate, and (d) user information layer protocol fields of a BCIE, with respect to several types of voice and data calls:

Example 1—Speech Call (a) information transfer capability: speech
(b) transfer mode: circuit
(c) information transfer rate: 64 kbps
(d) user information layer protocol: mu-law Example 2—3.1 kHz audio call (a) information transfer capability: 3.1 kHz audio
(b) transfer mode: circuit
(c) information transfer rate: 64 kbps
(d) user information layer protocol: mu-law Example 3—56 kbps data call (a) information transfer capability: unrestricted digital
(b) transfer mode: circuit
(c) information transfer rate: 64 kbps
(d) user information layer protocol: layer 1—rate adaption Example 4—64 kbps data call (a) information transfer capability: unrestricted digital
(b) transfer mode: circuit
(c) information transfer rate: 64 kbps
(d) user information layer protocol: null In the case of data calls with higher data rates, such as 384 kbps data call, the information transfer rate field of the BCIE will indicate the data rate explicitly.

"An ISDN connection would be included in a business setting where an ISDN capable private branch exchange (PBX) 28 provides the essential peripheral equipment using the ISDN standard. As noted before, in a non-ISDN connection, the LEC 22 receives the call over a "Switched 56" service and it switches the data call to the Feature Group-D data trunks. If the Signaling System 7 Network Interconnect has not been deployed on the Feature Group-D data trunks, the dialed number and ANI information will be delivered "in band" using some capacity of the digital line. For calls that arrive at an OSO/ACP (Originating Switch 25) on data trunks and for which the Network Carrier receives in band signalling, the OSO/ASP may automatically imply that these are Switched 56 call requests. That is, the data rate discriminator is implied strictly from the capacity of the trunk. No voice calls are made or received on these trunks; they are dedicated only to data calls.

In the embodiment of FIG. 1, in accordance with the present invention, in response to receiving a call placed to a common telephone number (e.g. an 800 telephone number) that needs further translation to ascertain an appropriate destination number, the originating switch 26 formulates a query to a data base so that it may continue processing the call. The software may use Global Title Translation. As will be explained later, in an alternate embodiment, the query can first be made to an INWATS database followed by a query to the Direct Services Dialing-Network Control Point 34.

Once the originating switch 25 has determined where a query message 44 should be sent to, the query is then transferred via signal transfer points 40, 42 to a proper Direct Services Dialing-Network Control Point 34, 35, where, for a voice call, the translation is made to a voice (POTS) number, based on the common discriminators. The voice call then is routed through the network to the desired destination.

Figure 2A:
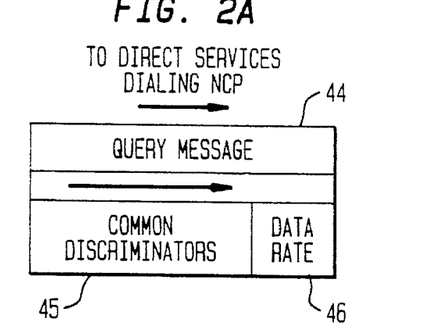
FIG. 2A is a block diagram which schematically illustrates a query message of the system in FIG. 1 where the query message is directed to the Direct Services Dialing database.
Figure 2B:
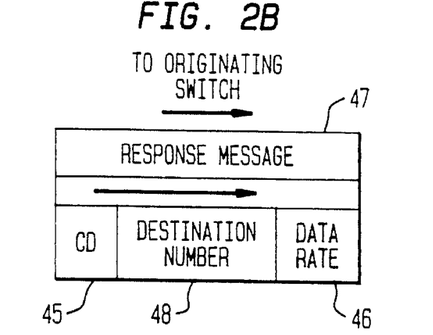
FIG. 2B is a block diagram which schematically illustrates the query response message which is directed back to the originating switch.

For data calls, however, the query message 44 (FIG. 2A) includes some of the common discriminators (CD) 45 and the data rate discriminator 46. The response message 47 (FIG. 2B) resulting from the query includes a destination number 48 based on the common discriminators 45 and the data rate capability expressed as the data rate discriminator 46. The data call is now routed to the destination number based on the data rate capability of the original call. For example, a 64 Kbps requested data rate is given one destination number to a facility such as in Atlanta for one type of data connection, while a 384 Kbps requested call for a video terminal connection is routed to another facility such as St. Louis where a video agent interacts with the caller to determine what purchases are desired.

In the present embodiment, an automatic message accounting (AMA) facility 50 records calls at the originating switch 26, so that subscribers may be billed. The Direct Services Dialing-Network Control Points 34, 36 also could have associated user support systems 55 for controlling the updating of the database and additional discriminators.

Figure 4A:
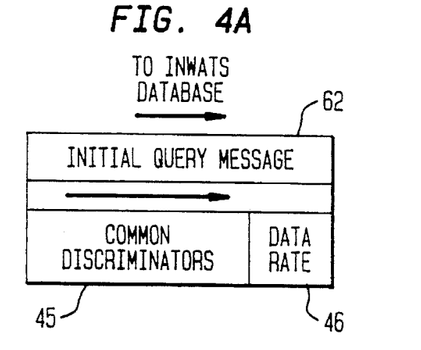
FIG. 4A is a block diagram which schematically illustrates an initial query message for the system of FIG. 3 where the query is directed to the INWATS database.
Figure 4B:
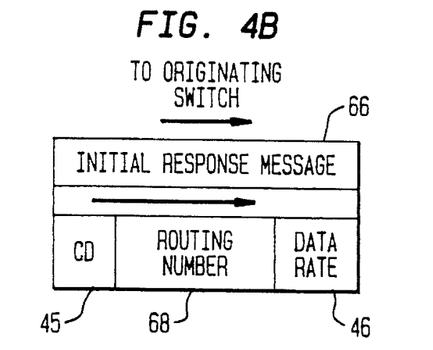
FIG. 4B is a block diagram which schematically illustrates the initial query response message which is directed back to the originating switch.

Referring now to the block diagram in FIG. 3, an alternate embodiment of the present invention is shown where the originating switch 26 first queries an INWATS database-Network Control Point 60. In this instance, the initial query 62 (FIG. 4A) includes some of the common discriminators 45, as well as the data rate discriminator 46, and it is transferred through the signalling network 30 via signal transfer points 40, 64 to the INWATS database-Network Control Point 60 (INWATS database-NCP). The INWATS database-NCP 60 passes through the query and returns an initial response message 66 (FIG. 4B) back to the originating switch 16 as a "XXX-XXX-XXXX" routing number 68 together with the common discriminators and the data rate. The INWATS database-NCP 60 would also include network support services 61.

Figure 4C:
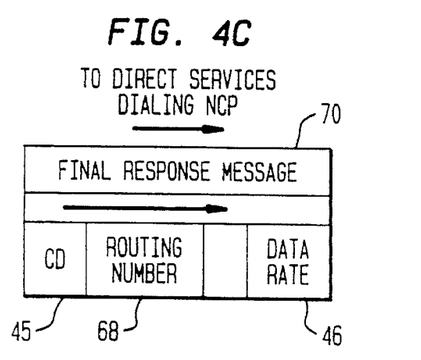
FIG. 4C is a block diagram which schematically illustrates the final query message directed from the originating switch to the Direct Services Dialing database.
Figure 4D:
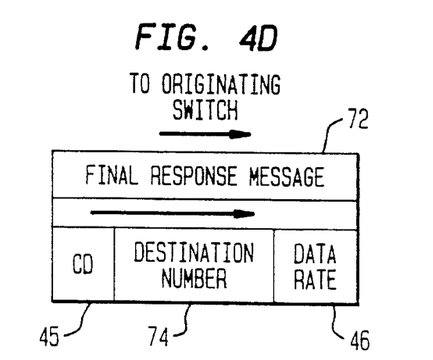
FIG. 4D is a block diagram which schematically illustrates the final query response message which is directed back to the originating switch from the Direct Services Dialing database.
Figure 5:
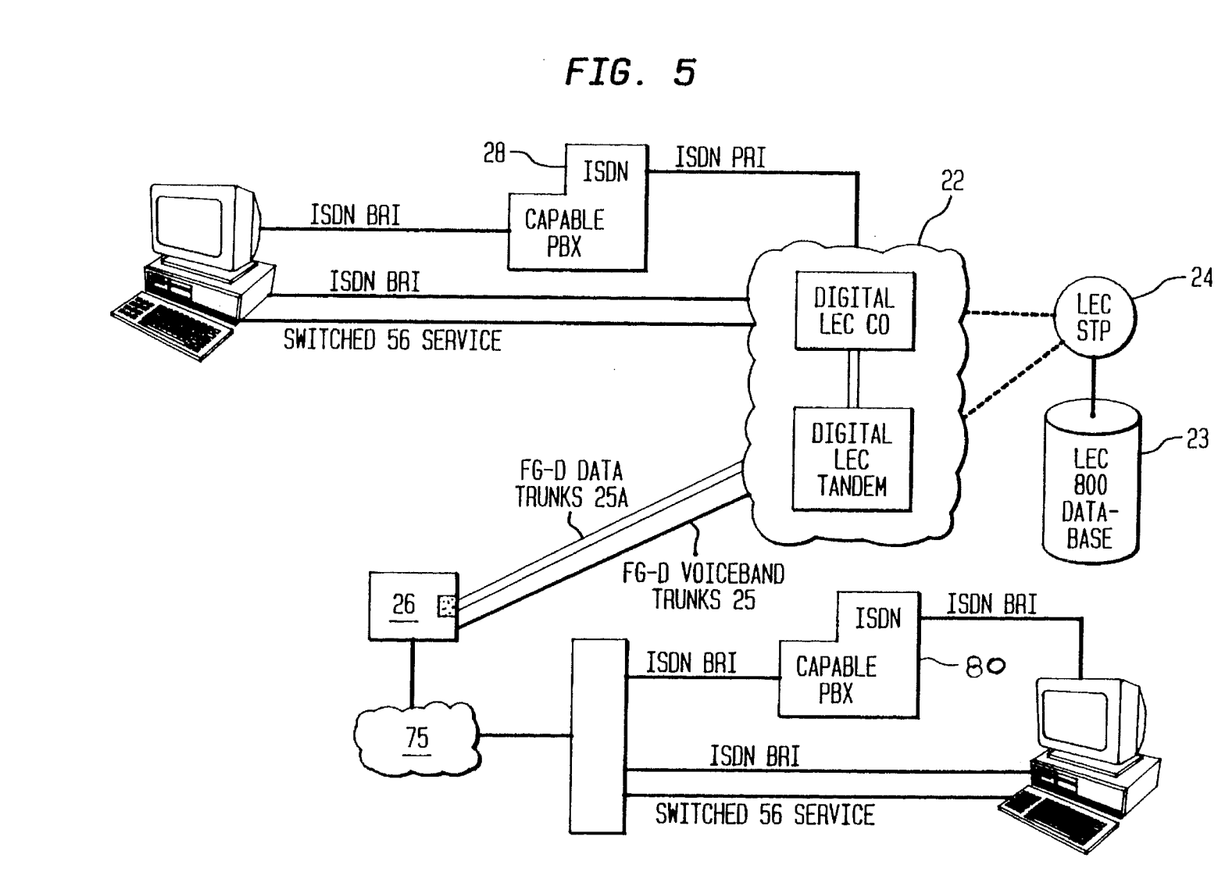
FIG. 5 is a block diagram illustrating the 800 toll free call flow from a caller, through a LEC, and to an originating switch.

The originating switch 26 then makes a final query message 70 (FIG. 4C) to the proper Direct Services Dialing-Network Control Point through signal transfer points 40 and 42, and includes the common discriminators 45, the routing number 68, and data rate discriminator 46. If the data rate discriminator is blank, the call is interpreted to be a voice call. The final response message 72 (FIG. 4D) is similar to that of the previous embodiment in FIG. 1, which includes the proper destination number 74. The call is then sent through the Network, such as the ATT Network 75, to its final destination, which in the illustrated embodiment is the video agent 10 for the data call and the voice agent 11 for the voice call. As shown in FIG. 5, the destination can be switched egress through the LEC with an ISDN PBX 80, or other ISDN devices or a Switched 56 service. Although not illustrated in detail in FIG. 5, the Feature Group-D (FG-D) trunking may be directly connected to the End Office without the need for a digital LEC tandem.

Figure 6A:
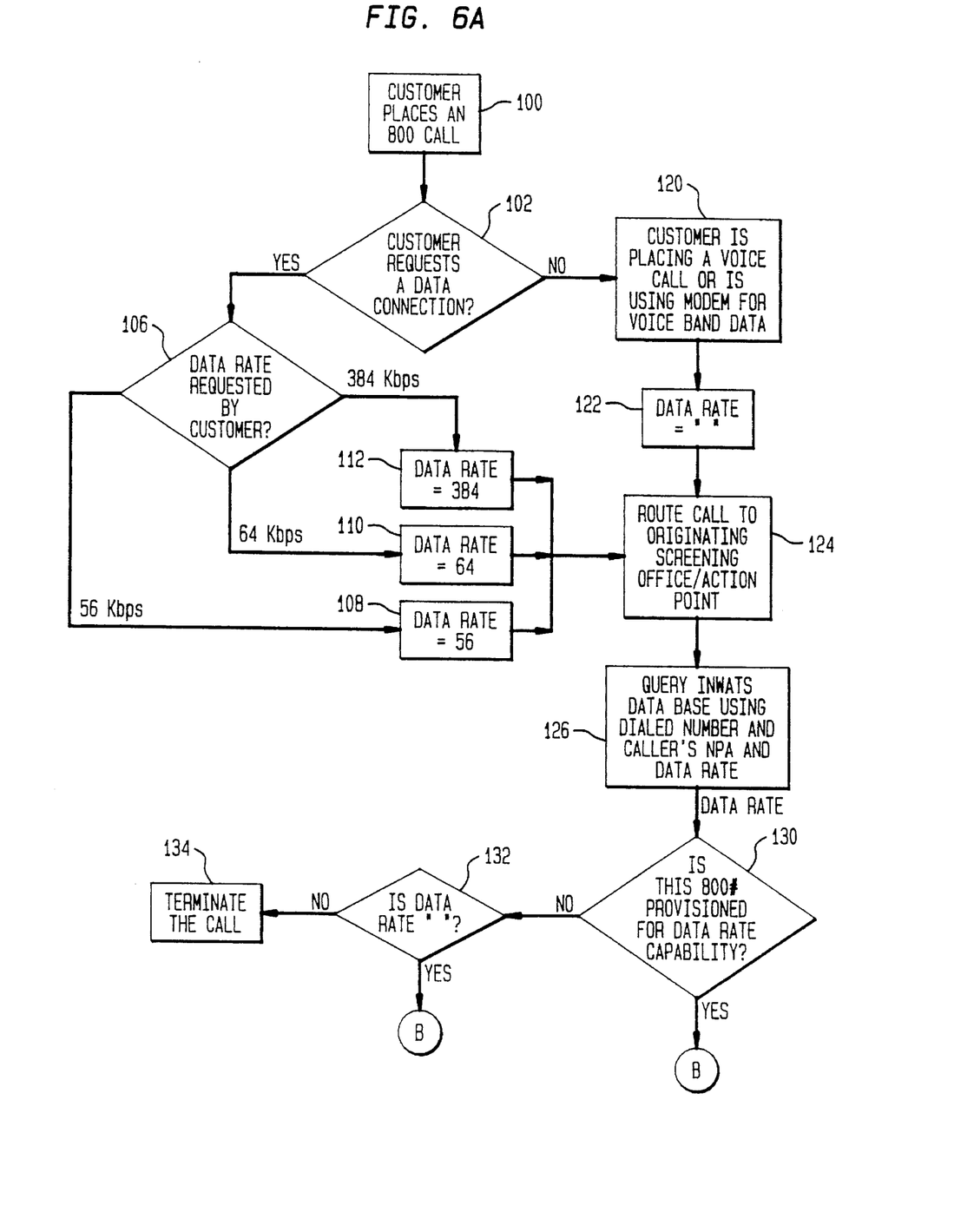
FIGS. 6A and 6B illustrate a flow diagram of the process for routing a phone call from a caller to a selected destination of a network subscriber based on voice and data transport capability.
Figure 6B:
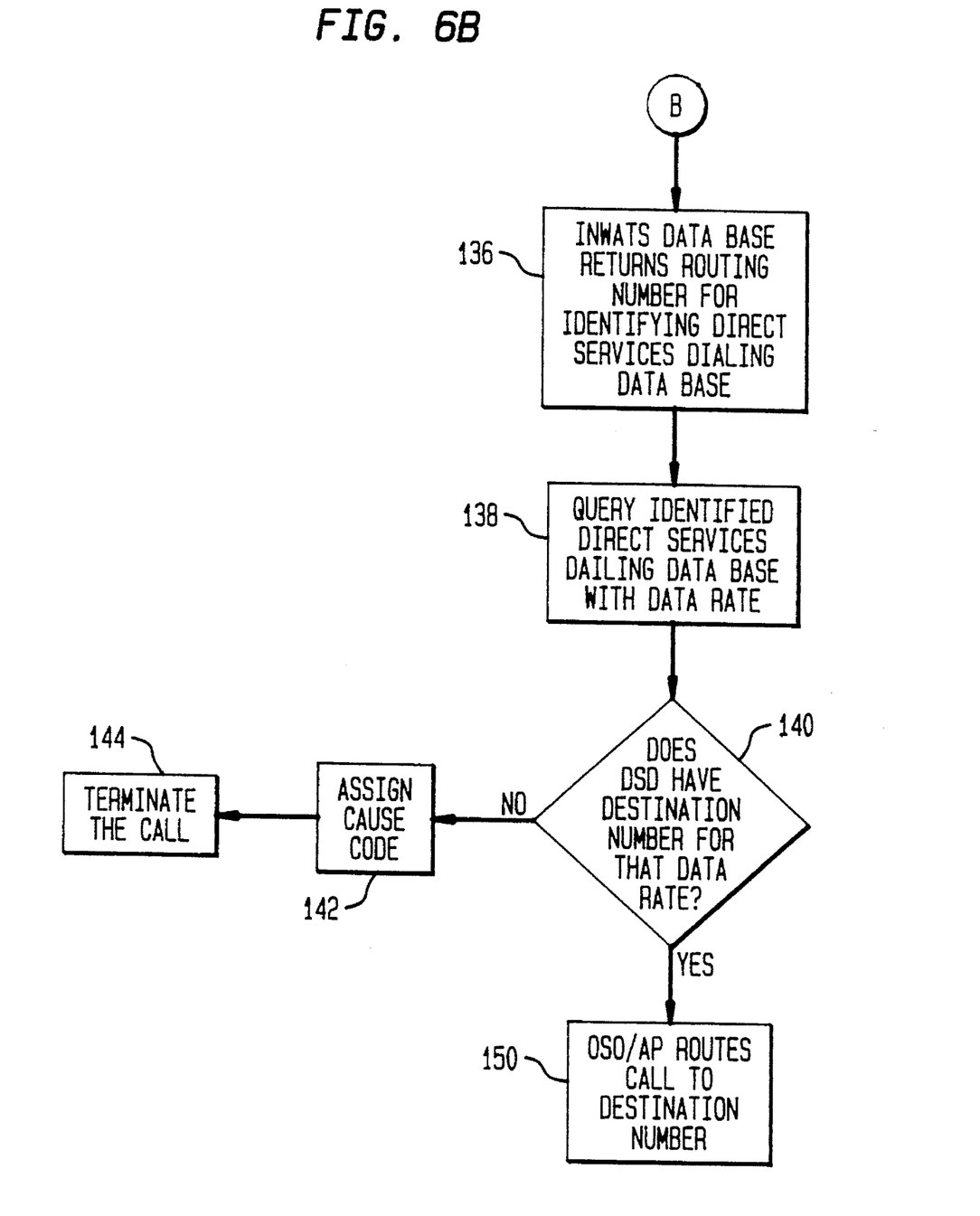

Referring now to FIGS. 6A and 6B, a flow chart illustrating the basic method of the present invention is illustrated. For purposes of understanding, the basic steps are set forth beginning with the numeral 100 with successive steps indicated typically as even numbered numerals.

A customer in step 100 initially places an 800 toll free call. In step 102, a determination is made as to whether the customer has requested a data connection. For ISDN subscribers, callers can, for example, request a data call by pushing a "data" button on their phone. Many other means can be used to request a data call. For Switched 56 Subscribers, all calls made from Switched 56 terminals are data calls. The data rate requested by the customer is determined in step 106. The data rate can vary, but for illustrative purposes, a 56 Kbps, 64 Kbps, and 384 Kbps rate 108, 110, and 112 are shown.

If the caller has not requested a data connection in step 102, then the caller has placed a voice call or is using a modem, fax or other device for voiceband data, (step 120). The data rate discriminator in step 122 is "blank" corresponding to the default of a voice call. Again as in the data call, the voice call is routed- to the Originating -Screening Office/Action Point (originating switch) in step 124. From the originating switch, a query could be generated as shown in the first embodiment of FIG. 1 to a Direct Services Dialing-NCP to obtain the destination number for that data rate. The illustrated flow chart, however, sets forth the embodiment shown in FIG. 3 where an INWATS database-NCP 60 is first queried.

In step 126, the originating switch queries the INWATS database-NCP using common discriminators such as the dialed number, the Callers NPA, and other discriminators mentioned before, as well as the additional data rate discriminator. In step 131 the INWATS database-NCP determines if the 800 number is provisioned for data rate capability. If the data rate field is not a "blank" (step 132) the caller has requested a data connection. If, however, the 1 800 number is not provisioned to handle a data connection, the call is terminated (step 134). If the data rate field is a "blank", in step 132, corresponding to a voice call, or the 800 number is provisioned for data rate capability in step 130, the INWATS database-NCP returns with the destination number or a routing number (step 136) which identifies the Direct Services Dialing-NCP to be queried to determine the destination number. In step 138, a query is sent by the originating switch to the Direct Services Dialing-NCP with the proper data rate as the discriminator in step 138.

The query determines if the Direct Services Dialing-NCP in step 140 has the destination number for that particular requested data rate. If the destination number is not known for that data rate, then in step 142 a cause, (i.e. error/code typically corresponding to a "bearer rate capability unassigned" message) is assigned and the call is terminated in step 144. Otherwise the originating switch routes the call to the destination number in step 150.

The present invention is advantageous because 800 toll free and similar voice calls can now be placed with end-to-end data connections and switched to separate locations based on caller requested data rates. Many new multimedia services are now available to such services, including: 1) compressed 7 Khz audio near CD quality; 2) image transfer that is at least six times faster than POTS; 3) data transfer that is at least six times faster than POTS; 4) image and data combined with voice that may add voice to existing data applications; and 5) video with voice at improved quality levels.

It is to be understood that the above description is only one preferred embodiment of the invention. Numerous other arrangements may be devised by one skilled in the art without departing from the spirit and scope of the invention.

That which is claimed is:

1. A method for routing a phone call from a caller through a public switched telephone network to a destination number selected by a network subscriber based on voice and data transport capability, wherein the phone call is one of either a voice or data call and wherein the destination number is one of a plurality of destination numbers selected by the subscriber identified by a common telephone number, comprising associating with a phone call a plurality of discriminators common to both voice and data calls and an additional data rate discriminator for a data call corresponding to the data rate used by the calling party, accessing a first database in response to receiving the common telephone number from the calling party to obtain a routing number, selecting a second database based on the routing number, accessing the second database for obtaining a destination number selected by the subscriber for a voice call based on the common discriminators and a separate destination number selected by the subscriber for a data call, wherein the separate destination number selected by the subscriber for a data call is based on the common discriminators and the data rate used by the caller, and completing the phone call by directing the phone call to the destination number selected by the subscriber.

2. The method according to claim 1 wherein said common telephone number is an INWATS telephone number and said first database is an INWATS database.

3. The method according to claim 1 wherein said second database is accessed via a data network comprising signal transfer points.

4. The method according to claim 1 including the step of querying the accessed second database to determine if the common telephone number is provisioned for the requested data rate capability and terminating the call if the number has no such data rate provision.

5. The method according to claim 1 wherein the second database comprises a direct services dialing database.

6. The method according to claim 1 including the step of routing the voice call along a voice trunkline and the data call along a data trunkline from a local exchange carrier to an originating network switch.

7. The method according to claim 1 wherein said data rate discriminator is implied by the data capacity of the data trunkline.

8. The method according to claim 1 including the step of reading the data rate from a call setup message when the caller has an ISDN connection.

9. A system for routing a phone call from a caller through a public switched telephone network to a destination number selected by a network subscriber based on voice and data transport capability, wherein the phone call is one of either a voice or data call, and wherein the destination number is one of a plurality of destination numbers selected by the subscriber identified by a common telephone number, comprising means for associating with a phone call a plurality of discriminators common to both voice and data calls and an additional data rate discriminator for a data call corresponding to the data rate used by the calling party, means for accessing a database in response to receiving the common telephone number from the calling party for obtaining a destination number selected by the network subscriber for a voice call based on the common discriminators and a separate destination number selected by the network subscriber for a data call, wherein the separate destination number selected by the network subscriber for a data call is based on the common discriminator and the data rate used by the caller, and means for completing the phone call by directing the phone call to the selected destination number.

10. The system according to claim 9 including means for routing the voice call along a voice trunkline and a data call along the data trunkline from a local exchange carder to an originating network switch.

11. The system according to claim 9 wherein said data rate discriminator is implied by the data capacity of the data trunkline.

12. The system according to claim 9 wherein the database comprises a direct services dialing database.

13. The system according to claim 12 including means for translating the common telephone number in an originating switch with the discriminators to determine the direct services dialing database to be accessed.

14. The system according to claim 9 including means for reading the data rate from a call setup message when the caller has an ISDN connection.

15. The system according to claim 9 including means for querying the database to determine if the common telephone number is provisioned for the requested data rate capability and means for terminating the phone call if the number has no such data rate provision.

16. The method according to claim 9 including a data network comprising signal transfer points for accessing said second database.

17. A system for routing a phone call from a caller through a public switched telephone network to a destination number selected by a network subscriber based on voice and data transport capability, wherein the phone call is One of either a voice or data call, and wherein the destination number is one of a plurality of destination numbers selected by the network subscriber identified by a common telephone number, comprising means for associating with a phone call a plurality of discriminators common to both voice and data calls and an additional data rate discriminator for a data call corresponding to the data rate used by the calling party, means for accessing a first database in response to receiving the common telephone number from the calling party to obtain a routing number, means for selecting a second database based on the routing number, means for accessing the second database for obtaining a destination number selected by the network subscriber for a voice call based on the common discriminators and a separate destination number selected by the network subscriber for a data call, wherein the separate destination number selected by the network subscriber for a data call is based on the common discriminator and the data rate used by the caller, and means for completing the phone call by switching the phone call to the destination number selected by the network subscriber.

18. The system according to claim 17 wherein said common telephone number is an INWATS telephone number and said first database is an INWATS database.

19. The system according to claim 17 including a data network comprising signal transfer points for accessing said second database.

20. The system according to claim 17 including means for querying the accessed second database to determine if the common telephone number is provisioned for the requested data rate capability and means terminating the phone call if the number has no such data rate provision.

21. The system according to claim 17 wherein the second database comprises a direct services dialing database.

22. The system according to claim 17 including means for muting the voice call along a voice trunkline and a data call along the data trunkline from the local exchange carder to an originating network switch.

23. The system according to claim 17 wherein said data rate discriminator is implied by the data capacity of a data trunkline.

24. The system according to claim 17 including means for reading the data rate from a call setup message when the caller has an ISDN connection.

* * * * *